United States Patent
Lee et al.

(10) Patent No.: US 6,513,028 B1
(45) Date of Patent: Jan. 28, 2003

(54) METHOD, SYSTEM, AND PROGRAM FOR SEARCHING A LIST OF ENTRIES WHEN SEARCH CRITERIA IS PROVIDED FOR LESS THAN ALL OF THE FIELDS IN AN ENTRY

(75) Inventors: Christina Marie Lee, San Jose, CA (US); Lee-Chin Hsu Liu, San Jose, CA (US); Desai Paramesh Sampatrai, San Jose, CA (US); Hong Sang Tie, San Jose, CA (US); Shyh-Yee Wang, Cupertino, CA (US); Yun Wang, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/344,727

(22) Filed: Jun. 25, 1999

(51) Int. Cl.[7] .............................................. G06F 17/30
(52) U.S. Cl. .............................................. 707/2; 707/5
(58) Field of Search ...................................... 707/1–7

(56) References Cited

U.S. PATENT DOCUMENTS

| | | | | |
|---|---|---|---|---|
| 5,469,568 A | | 11/1995 | Schiefer et al. ............. 395/600 |
| 5,495,608 A | | 2/1996 | Antoshenkov ............... 395/600 |
| 5,664,172 A | | 9/1997 | Antoshenkov ............... 395/604 |
| 5,727,196 A | * | 3/1998 | Strauss, Jr. et al. ......... 395/602 |
| 5,734,893 A | | 3/1998 | Li et al. ...................... 395/615 |
| 5,748,952 A | * | 5/1998 | Chadha et al. .............. 395/602 |
| 5,758,146 A | | 5/1998 | Schiefer et al. ................ 707/2 |
| 5,778,354 A | | 7/1998 | Leslie et al. .................... 707/2 |
| 5,852,822 A | | 12/1998 | Srinivasan et al. ............. 707/4 |
| 5,873,079 A | | 2/1999 | Davis, III et al. ............... 707/3 |
| 6,044,370 A | * | 3/2000 | Anfindsen ...................... 707/4 |
| 6,061,677 A | * | 5/2000 | Blinn et al. .................... 707/3 |
| 6,070,164 A | * | 5/2000 | Vagnozzi .................... 707/100 |
| 6,185,557 B1 | * | 2/2001 | Liu ................................. 707/4 |
| 6,275,861 B1 | * | 8/2001 | Chaudri et al. ............. 709/238 |
| 6,292,794 B1 | * | 9/2001 | Cecchini et al. ................ 707/3 |

OTHER PUBLICATIONS

Douglas Comer, "The Ubiquitous B–Tree", Computing Surveys, vol. 11, No. 2, Jun. 1979, pp. 121–137.
Michael Freeston, "A General Solution of the n–dimensional B–tree Problem", Association of Computing Machinery (ACM), 1995, pp. 80–91.

* cited by examiner

*Primary Examiner*—James P. Trammell
*Assistant Examiner*—Mary Wang
(74) *Attorney, Agent, or Firm*—David W. Victor; Konrad Raynes Victor & Mann LLP

(57) ABSTRACT

Disclosed is a system, method, and program for searching a list of entries. Each entry is comprised of multiple fields. Each field in the entry may include one of a range of possible values for that field. If search criteria is provided for less than all of the fields, then multiple search keys will be generated such that each generated search key includes a search value for each field. The search value for each field for which there are no provided search criteria comprises one of the possible values for that field. A search operation is executed for each of the generated search keys to determine entries in the list that include field values that match the search values in the search key.

31 Claims, 3 Drawing Sheets

200

| | C1/Date of Sale | C2/Store Location | C3/Product Sold |
|---|---|---|---|
| 201 | 1/31/97 | Chicago | Coat |
| 202 | 1/31/97 | Chicago | Detergent |
| | 1/31/97 | Chicago | Hat |
| 204 | 1/31/97 | Chicago | Shirt |
| | 1/31/97 | Chicago | Shoe |
| | 1/31/97 | Detroit | Coat |
| | 1/31/97 | Detroit | Detergent |
| 206 | 1/31/97 | Detroit | Shirt |
| 208 | 1/31/97 | Detroit | Shoe |
| | 1/31/97 | San Jose, CA | Coat |
| 210 | 1/31/97 | San Jose, CA | Detergent |
| | 1/31/97 | San Jose, CA | Hat |
| 212 | 1/31/97 | San Jose, CA | Hat |
| | 1/31/97 | San Jose, CA | Shirt |
| | 1/31/97 | San Jose, CA | Socks |
| | ... | ... | ... |
| | 1/31/97 | San Simeon, CA | Detergent |
| | ... | ... | ... |

Fig. 3

METHOD, SYSTEM, AND PROGRAM FOR SEARCHING A LIST OF ENTRIES WHEN SEARCH CRITERIA IS PROVIDED FOR LESS THAN ALL OF THE FIELDS IN AN ENTRY

CROSS-REFERENCE TO RELATED APPLICATIONS

This application is related to the following co-pending and commonly-assigned patent applications, all of which are filed on the same date herewith, and which are incorporated herein by reference in their entirety:

Method, System, and Program for a Join Operation on a Multi-column Table and Satellite Tables Including Duplicate Values, to Stephen Yao Ching Chen, Patrick Michael Malone, Jerry Mukai, Jeffrey Ralph Ruggles, Desai Paramesh Sampatrai, Yun Wang, Guogen Zhang, having attorney docket no. ST9-99-025;

Method, System, and Program for Performing a Join Operation on a Multi-Column Table and Satellite Tables, to Stephen Yao Ching Chen, William Y.

Kyu, Fen-Ling Lin, Desai Paramesh Sampatrai, and Yun Wang, having attorney docket no. ST9-99-030; and Method, System, and Program for Determining the Join Ordering of Tables in a Join Query, to Lee-Chin Hsu Liu, Hong Sang Tie, Shyh-Yee Wang, and Yun Wang, having attorney docket no. ST9-99-053.

BACKGROUND OF THE INVENTION

1. Field of the Invention

The present invention relates to a method, system, and program for searching a list of entries when search criteria is provided for less than all of the fields of the entries. In particular, the list of entries comprise a database index having a separate column for each field in the index entries.

2. Description of the Related Art

Data records in a relational database management system (RDBMS) are maintained in tables, which are a collection of rows all having the same columns. Each column maintains information on a particular type of data for the data records which comprise the rows. One or more indexes may be associated with each table. An index is an ordered set of pointers to data records in the table based on the data in one or more columns of the table. In some cases, all the information needed by a query may be found in the index, making it unnecessary to search the actual table. An index is comprised of rows or index entries which include an index key and a pointer to a database record in the table having the key column values of the index entry key. An index key is comprised of key columns that provide an ordering to records in a table. The index key columns are comprised of the columns of the table, and may include any of the values that are possible for that particular column. Columns that are used frequently to access a table may be used as key columns.

Index entries are often stored in a B-tree data structure, or balanced tree. A B-tree consists of a single root page and a number of leaf and non-leaf pages. The leaf pages store the index entries. Each index entry consists of key values and the physical address or identifier of the row or record in the data base table which has that value in its key columns. A non-leaf page stores key values and pointers to other index pages. An index may be searched for matching key values by an index scan. A scan of the index traverses from the root page down to the leaf page looking for the index entries that have the matching keys. The pages which store the index entries are maintained in a storage device, such as a hard disk drive or other non-volatile memory accessible to the database program.

A query can be made against an index to retrieve index entries using a search key that includes values for each of the key columns. The search locates the first index entry that has a key value that matches the search key, i.e., the values in the key columns in the search key match the values for the key columns in the index entry. A query often scans the rows of a table or index applying a search predicate for a comparison operation. A query of an index can qualify rows of a table for retrieval or access. The cost of an index scan is equal to the input/output (I/O) processing time to search the index plus the I/O time needed to access the index entries that qualify or match the search predicate. The time to transfer qualified matching index entries from physical storage to memory is usually many times greater than the time to scan the index entries in memory. Because transferring data from physical storage to memory takes substantially longer than processing time, the total time required to manipulate data can be substantially reduced if the number of data transfers from storage to memory can be reduced or otherwise minimized. Methods for optimizing data retrieval using index scanning are described in the commonly assigned U.S. Patent entitled "Method and Apparatus for Optimizing Data Retrieval Using Index Scanning," U.S. Pat. No. 5,758,146, which patent is incorporated herein by reference in its entirety.

An index may have multiple-columns for the key, e.g., C1, C2, C3. A B-tree would include values for each of the records in the multi-column index. An index defined on multiple key columns can be searched or accessed on any subset of key columns.

To search a multi-column index with a search key providing a search predicate for each key column, e.g., C1, C2, and C3, the search engine will scan the index and find qualifying index entries that have key column values that match those of the search key. Qualifying index entries includes accessing those index entries that match he search key by transferring the page including the qualified index entry from storage to computer memory.

Queries may be executed in which there are no search criteria or predicates for one or more of the key columns in a multi-column index, referred to as missing key columns. In such case, the search will request a range of entries that include every possible value of the missing key column or combination of the missing key column with key columns of lower order than the missing key. The leading or highest order key column in a key is the leftmost key column, or key column that determines the highest order of an entry. The key columns following the leading key column have the next lower order with respect to the previous key column. For example, a search on a multi-column index having keys columns C1, C2, and C3 may involve search predicates on C1 and C3, but not C2. In such case, the query requests all index entries in a range defined by the search criteria of C1 and all possible values for C2 and C3, which are the missing key column and lower order key column. For instance, if the search criteria requested all index entries having C1=1 and C3=3, the search engine would qualify all index entries matching the keys of (1, 0, 0) to (1, max, max), where the lowest possible value for C2 and C3 is zero, and max is the highest possible value. The accessed or qualified index entries will be further processed to determine those that satisfy all search criteria. The problem with such search techniques when criteria are not provided for all key columns is that numerous index entries may qualify, thereby requiring I/O retrievals from secondary storage of entries that do not match all the search criteria. Moreover, if the leading key column is the missing key column, then all index entries in the multi-column index will qualify, i.e., the entire contents of the B-tree including the multi-column index will be returned.

For example, the three column index may index records concerning product sales by date (C1), geographical location of sale (city) (C2), and product sold (C3), e.g., C1 represents 100 possible dates, C2 represents 1,000 possible cities, and C3 represents 10,000 possible products. If a query is executed for sales in January of 1998 for all hats, regardless of city, i.e., no search predicate for C2, then the search engine would qualify all index entries that had a date of January, 1998, regardless of the city and product values. This could require the possible access, i.e., I/O transfer, of 10 million index entries (1,000 cities times 10,000 products), even though only a small subset of such index entries would match all the search criteria. The search engine will then process the qualified index entries to locate those that match the two search criteria for C1 and C3.

Thus, in a multi-column search operation where there are no search predicates for one or more of the columns, current search techniques would qualify a substantial number of records that do not meet all the search criteria. In large database systems where there are thousands of possible values for any column, having to qualify non-matching index entries for all possible values on certain key columns could involve a substantial number of data transfer operations. As discussed, one of the primary time constraints for search operations is the time to access the index entries, i.e., transfer the index entries from non-volatile storage to computer memory for further processing.

Accordingly, there is a need in the art for an improved system, method, and program for qualifying index entries in a multi-column index when there is no search predicate or criteria for one of the columns in the index.

SUMMARY OF THE PREFERRED EMBODIMENTS

To overcome the limitations in the prior art described above, preferred embodiments disclose a system, method, and program for searching an ordered list of entries. Each entry is comprised of multiple fields. Each field may include one of a range of possible values for that field. If search criteria is provided for less than all of the fields, then multiple search keys will be generated such that each generated search key includes a search value for each field. The search value for each field for which there are no provided search criteria comprises one of the possible values for that field. A search operation is executed for each of the generated search keys to determine entries in the list that include field values that match the search values in the search key.

In further embodiments, the list of entries may comprise a database index having rows of index entries and a column for each field. In such case, an index entry includes values for each column in the index and information addressing at least one record in a database table.

In still further embodiments, each search operation is executed after generating the search key for the search operation. Further a feedback entry in the list is received in response to the search operation. The feedback entry is processed to determine a next search key to use in the next search operation.

In yet further embodiments, the processing of the feedback entry to determine the next search key comprises determining a next possible entry in the list that would immediately follow the feedback entry in the list according to the ordering of the entries in the list. This determined next possible entry is used as the next search key.

Preferred embodiments provide improved methods for generating search operations for a search on a multi-column index that does not search on or qualify index entries that do not satisfy all search criteria. Preferred embodiments provide methods for selecting a search value for the missing column. The search keys used to execute the search include the search predicates and a selected value for the missing column(s). This is an improvement over prior art techniques which qualify all index entries in a range of entries including all possible values for the missing key column and any lower order key columns. Such prior art search techniques often qualify a substantial number of index entries that do not satisfy all the search criteria. Qualifying an index entry requires accessing data from storage. In large databases where an index has millions of rows, qualifying non-matching search entries could consume substantial processing resources and significantly impact search performance. Certain preferred embodiments utilize the column values for index entries returned in response to a search request to determine the search values to use for the next generated search key. Using the results of previous search operations as feedback to generate a subsequent search key minimizes qualifying non-matching search entries between the last retrieved entry and the feedback entry.

BRIEF DESCRIPTION OF THE DRAWINGS

Referring now to the drawings in which like reference numbers represent corresponding parts throughout:

FIG. 3 is an example of a three column index which is used to describe search algorithms in accordance with preferred embodiments of the present invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
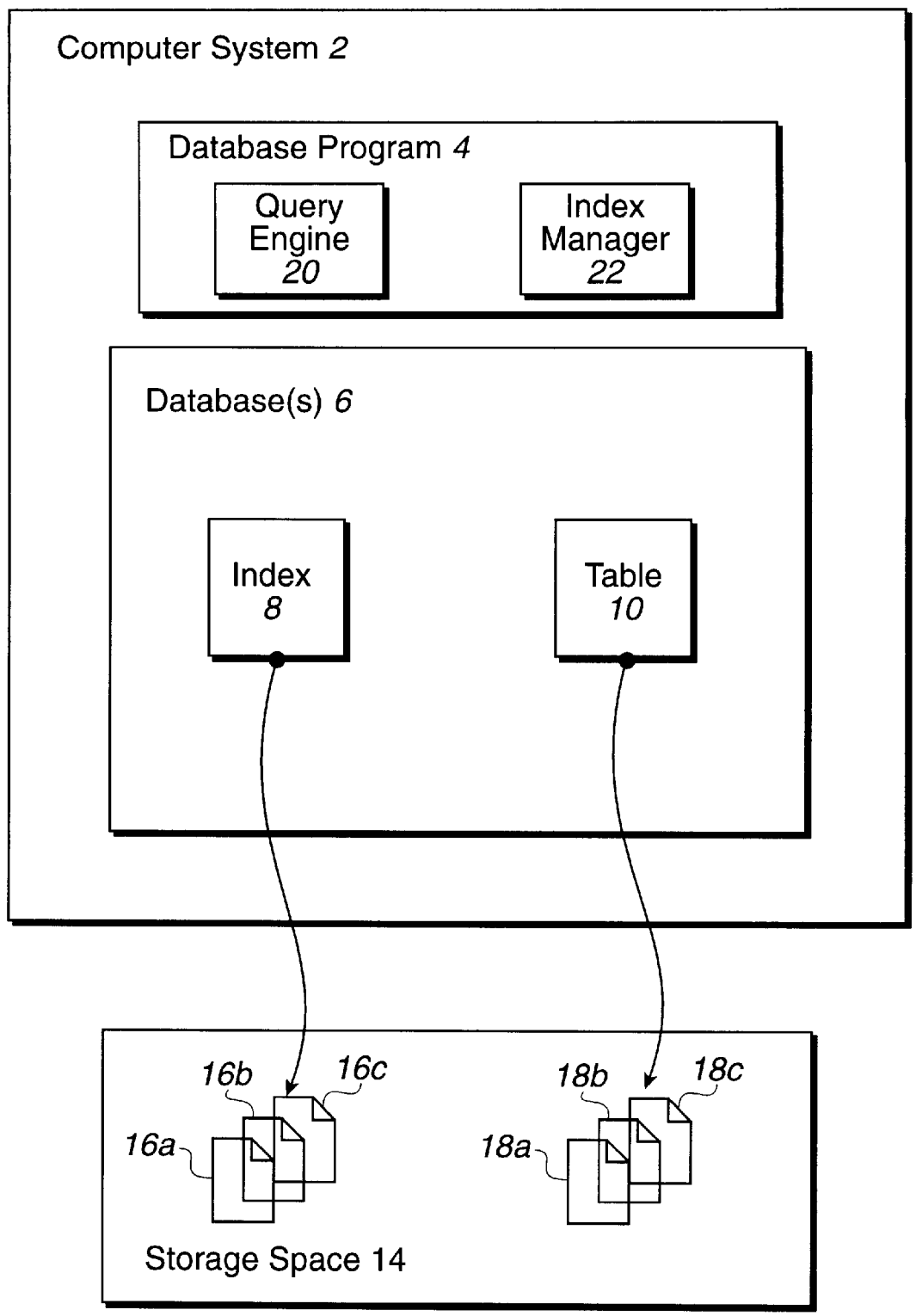
FIG. 1 is a block diagram illustrating a computing environment in which preferred embodiments of the present invention are implemented.

FIG. 1 illustrates a computing environment in which a database may be implemented. A computer system 2, which may be a computer including an operating system such as MICROSOFT WINDOWS 98 and WINDOWS NT, AIX, OS/390, OS/2, MVS, etc., includes a database program 4, such as DB2, MICROSOFT Access, Oracle Corporation's ORACLE 8, etc. The database program 4 is used to access database information maintained in one or more databases 6. The database(s) 6 may consist of one or more indexes 8 and one or more tables 10. The indexes 8 provide an ordered set of pointers to data in the table 10 based on the data in one or more columns of the table. Further details of the structure and operation of a database program are described in the IBM publications "DB2 for OS/390: Administration Guide, Version 5" IBM document no. SC26-8957-01 (Copyright IBM. Corp., June, 1997) and "A Complete Guide to DB2 Universal Database," by Don Chamberlin (1998), which publications are incorporated herein by reference in its entirety.

**Microsoft, Windows, and Windows NT are registered trademarks of Microsoft Corporation; DB2, AIX, OS/390, and OS/2 are registered trademarks of IBM, MVS is a trademark of IBM; and Oracle8 is a trademark of Oracle Corporation.

A storage space 14 stores the actual data sets that include the data for the indexes and tables. The storage space 14 includes the pages 16a, b, c which contain the index entries for the index 8, such as the leaf pages when the index 8 is comprised of a B-tree. The storage space 14 further includes pages 18a, b, c of the records in the table 10. The storage space 14 may comprise a non-volatile storage space, such as a direct access storage device (DASD), which is comprised of numerous interconnected hard disk drives. Alternatively the storage space 14 may comprise storage pools within non-volatile memory, or a combination of non-volatile and volatile memories. When an index entry is qualified by scanning the index 8 to find entries that match a search predicate, then the page 16a, b, c containing that index entry is transferred into a volatile, memory area within the computer system 2, such as a RAM, DRAM, etc., where it may then be processed by the database program 4.

The database program 4 includes a query engine 20 component and an index manager 22 component. The query engine 20 receives a search request including criteria to use to retrieve database records in the table 10. The search engine may execute the search by processing all the records in the table 10 or scan an index 8 having columns that are involved in the search. The query engine 20 would scan the index 8 to restrict the records in the table 10 that are fetched, thereby reducing the number of record transfers or I/O operations concerning pages 18a, b, c that include the table 10 records. The scanning of the index 8 may be performed by an index manager 22 component. Indexes provide two useful properties for the query engine 20, an associate retrieval property and an ordering property. The associate retrieval property means that the index can be used to quickly find rows that have a given value. This is useful for evaluating predicates on the key columns. The ordering property means that the index can be used to retrieve all the rows of a table in the order of the key value.

To minimize the number of table 10 records to fetch from storage 14, the query engine 20 may execute a partial scan that applies search criteria (predicates) on the index 8 columns to determine a subset of table 10 records to fetch or qualify for further searching. A full scan is used to retrieve all the rows of the table 10 according to the ordering of the key values in the index 8.

The index manager 22 performs the index management and searching operations in a manner known in the art. The query engine 20 will provide the index manager 22 a search key including search predicates on each of the index key columns. In response, the index manager 22 will scan the B-tree structure storing the index entries and fetch all pages 16a, b, c from the storage space 14 that include index entries having key column values that match the search key column values. If the index manager 22 cannot locate a matching index entry, then the index manager 22 would return the next higher index entry in the multi-column index as the feedback key. As discussed, in current index searching operations, if a search predicate is not provided for one of the key columns in a multi-column index, i.e., a missing column, then the query engine 20 will return all index entries within a range, including non-matching index entries, that includes all combinations of the missing key column with lower order key columns. Further, if there is no search predicate for the leading key column, then all the index entries in the B-tree will qualify. Thus, in the current art, missing search predicates on the key columns limit the usefulness of multi-column key index access as the search engine would qualify numerous non-matching index entries.

Preferred embodiments provide an improved searching algorithm implemented in the search manager 20 to provide values for the missing key columns in order to allow key column searching on all the key columns in a multi-column index to minimize both the number of search requests and the number of qualifying index entries. This in turn minimizes the number of I/O operations between the computer system 2 and storage space 14, thereby significantly improving database performance in large database system which may have in excess of 100 million records.

Missing Key Generation

Preferred embodiments are implemented as software logic within the query engine 20 to optimize searches on a multi-column index when a search does not include search criteria on one or more of the index keys. The preferred embodiments provide search values for the missing key columns in a manner that minimizes the number of multi-column index entries that would qualify for a search based on less than all the key columns of the index.

One possible implementation would be to execute multiple searches in which the missing key column is set to each possible value of the missing key column. For instance, in multi-column index (C1, C2, C3), if a search specified predicates on C1 and C3, then the query engine 20 may generate separate searches of the index using the search criteria for C1 and C3 and each possible value of C2, and qualify all such matching index entries for retrieval from storage 14. This method is advantageous over current methods as it would only qualify index entries that match the search criteria on C1 and C3, thus qualifying substantially fewer entries that would qualify with current techniques that would qualify all possible values for key columns of lower order than the missing key column. Hence, searching on every possible value of the missing key column would provide improvements over current search techniques by restricting qualification to index entries that match the search criteria. Nonetheless, this first implementation is less than optimal as the search engine 22 may generate search requests for non-existent entries as there may not be entries for every possible value of the missing key column and matching predicates on the non-missing key columns.

Figure 2:
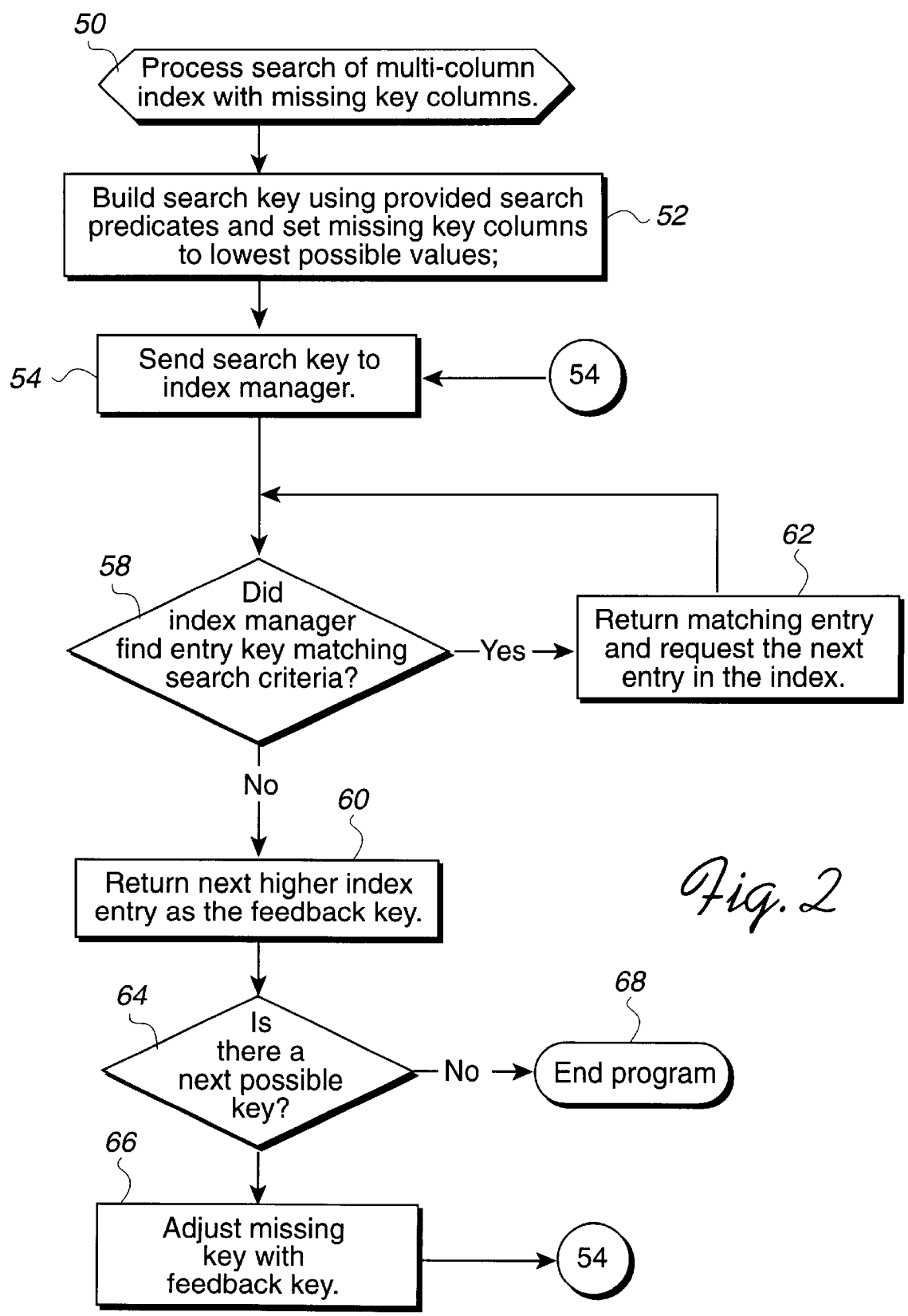
FIG. 2 illustrates logic to process a search request of a multi-column index when no search criteria are provided for one or more of the columns in accordance with preferred embodiments of the present invention.

FIG. 2 illustrates logic implemented in the query engine 20 to perform a partial index scan to qualify index entries when the search does not include search predicates for one or more of the key columns in a multi-column index, i.e., missing key columns. As used herein the term "leading key column" or "highest key column" refers to the first key column in a multi-column index. Each subsequent key column in the multi-column index is referred to as "lower" than the previous key column, such that the final key column is the "lowest key column." The rank of the ordering of an index entry is determined by the values in each of the key columns according to the ordering indicated in the leading key column (C1) to the lowest key column Cn. Further, for a given key column, the key column has values ordered from a lowest value in the ordering to a highest value in the ordering.

The software logic begins in FIG. 2 at block 50 with the query engine 20 processing a search on a multi-column index with one or more missing key columns and search values for at least one of the key columns. The query engine 20 (at block 52) builds an initial search key using the lowest possible value of the search predicates, if there is range of search criteria, for the non-missing key columns and the lowest possible values for the missing key columns. If the search criteria specifies a range on a column, then the initial value for that column is the lowest possible value. The query engine 20 then sends (at block 54) this search key to the index manager 22 which executes the search key against the B-tree index 8 to locate an index entry matching the search key. If the index manager 22 returns (at block 58) an entry key matching the search criteria, then the query engine 20 returns the entry satisfying the search criteria and then (at block 62) requests the next entry in the index 8, and returns to block 58 to determine whether this next entry satisfies the search criteria. A next entry that satisfies the search criteria may be a next entry in the index that matches the search key or the next entry that does not match the search key but still satisfies the search criteria. If the returned entry key does not match the search criteria, then the index manager 22 returns (at block 60) the next entry (feedback) following the match in the fact table, that does not satisfy the search criteria. The query engine 20 then determines (at block 64) whether there is a next possible key in the space of possible keys. If so, the query engine 20 adjusts the missing key with the feedback key to determine a next possible entry in the index that follows the feedback and satisfies the search criteria, and then returns to block 54 to search the index on the adjusted key. If there is not a next possible key at block 64, then the program ends at block 66.

For instance, if the key column values for the feedback index entry do not match the search criteria, then the query engine 20 determines the next possible key column directly following the feedback key according to the ordering of the index entries in the B-tree, based on the possible values for the key columns. For instance, if each key column value can be an integer from 0 to 5, then the next possible key following the key (1, 2, 3, 4) would be (1, 2, 3, 5); the key following (1, 2, 4, 5) would be 1, 2, 5, 0.

In this way, the key for the returned feedback index entry is used to determine the next search key to use. Using actual index entries as feedback in generating the search key avoids generating searches for index entries that do not exist in the index being searched. If a feedback entry is non-consecutive in ordering with respect to the previous matching entry, i.e., the index is missing numerous possible entries between the last matching index entry and feedback entry, then using the feedback entry to determine the search key will allow the query engine 20 to avoid generating searches on non-existent index entries between the last matching index entry and the feedback entry. Thus, the preferred algorithm avoids searching on keys for non-existent index entries, thereby avoiding unnecessary search operations. This multi-column index search algorithm of FIG. 2 is an improvement over current techniques which qualify all index entries within a range including all possible values for the missing key column and lower order key columns. The preferred embodiment algorithm only searches for and qualifies index entries that match the provided search criteria. The preferred algorithm minimizes qualifying index entries that do not match the search criteria.

FIG. 3 illustrates an example of a three column index 200 including key columns used to index database records for product sale information. The first column C1 indicates a date of sale, C2 indicates a store location, and C3 indicates products sold. This index 200 would reference records in a database table that include further fields/columns of information concerning the sale. An example will consider a search including search values for the date and product sold key columns of Jan. 31, 1997 and a hat, respectively. In this example, there is no search predicate for the location key column C2, which is the missing key column. Considering the logic of FIG. 2, the query engine 20 would construct (at block 52) a search key using the lowest key value for the missing key column. The location key column C2 may order cities alphabetically, starting with the minimum city value. In response to a search on the lowest key value for the city column C2, there would be no match, and the returned index entry would be (Jan. 31, 1997, Chicago, Coat) 201 as the feedback key. Because this feedback key 201 does not match the search criteria, the next possible value in the space that would satisfy the search criteria is (Jan. 31, 1997, Chicago, Hat), which is used as the next search key.

Searching on (Jan. 31, 1997, Chicago, Hat), the index manager 22 would return index entry 202 as a matching key value and the next index entry 204 (Jan. 31, 1997, Chicago, Shirt) as the feedback key. The query engine 20 would then consider possible key values to determine the next possible key following feedback key (Jan. 31, 1997, Chicago, Shirt) that matches the search criteria and use this determined next possible value to search the index.

Assuming Detroit follows Chicago in the location ordering (C2), the next possible value for C2 with matching search criteria on C1 and C3 would be (Jan. 31, 1997, Detroit, Hat). The query engine 20 would submit this next possible value at block 54 to the index manager 22. The index manager 22 would then return the index entry (Jan. 31, 1997, Detroit, Shirt) 206 as the feedback entry that would follow the entry of the search key in the index 200 ordering. Because this feedback entry does not match the search criteria (at block 58), the search engine would determine the next possible matching key in the index 200 ordering. Assuming Eureka is the next possible location following Detroit, the search manager 20 would generate a search key comprising (Jan. 31, 1997, Eureka, Hat) and submit this search key to the index manager 22. As there are no index entries for Eureka, or any other cities between Detroit and San Jose, the index manager 22 would return the index entry (Jan. 31, 1997, San Jose, Coat) 208.

After receiving as feedback entry 208, the query engine 20 would use the feedback key to adjust the missing key columns to determine the next possible matching key value, which would be (Jan. 31, 1997, San Jose, Hat) and use this key to search the index. This search would result in two matching entries 210, 212. If San Simeon was the next possible location following San Jose, then the query engine 20 would generate a search on (Jan. 31, 1997, San Simeon, Hat). If the index 200 did not include any more matching entries, then the search would end with an end of index message returned to the query engine 20.

As the discussion with respect to FIG. 3 illustrates, the logic of FIG. 2 is clearly an improvement over current searching techniques on missing columns that would qualify all entries from (Jan. 31, 1997, Chicago, Coat), assuming Chicago and Coat are the first possible values for columns C2 and C3, respectively, to (Jan. 31, 1997, San Simeon, Detergent), and beyond if there are any further entries. Prior art techniques would qualify at least all shown sixteen entries in the index 200. The logic of FIG. 2 as applied to index 100, on the other hand, only qualified six entries. As the index expands to hundreds of millions of rows, the preferred logic of FIG. 2 would qualify millions of fewer rows, thus requiring millions of fewer storage access operations than current techniques for searching on missing key columns.

The application of the preferred embodiment algorithm in FIG. 2 to index 200 in FIG. 3 illustrates how missing key column values are determined to minimize the number of search requests and index entries that qualify for further determinations. With the preferred logic, search requests are only made for specific key values. The preferred logic would avoid qualifying non-matching index entries. The preferred logic thus may avoid millions of data transfer operations in large databases comprised of millions of records and, thereby dramatically improve search performance by simultaneously reducing the number of search requests and qualifying index entries.

CONCLUSION

This concludes the description of the preferred embodiments of the invention.

The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to a search engine and index manager program components. However, in further embodiments, the functions performed by the index manager and search engine may be bundled in a single program component or located in additional program components.

Preferred embodiments were described with respect to an algorithm to restrict the number of search operations and data transfer operations when searching a multi-column index on search criteria for less than all the columns of the index. However, those skilled in the art will appreciate that the searching algorithm of the preferred embodiments may apply to search operations performed with respect to any type of data structures comprised of columns or rows or a list of records that have ordered values for common fields of information. The preferred embodiment search techniques are not limited to indexes or other database structures, such as tables or other combinations of ordered data that must be considered.

The algorithm of the preferred embodiments was described as having particular steps in a particular order. However, alternative algorithms in accordance with the invention may include modifications, deletions, and/or additions to the steps described in the preferred embodiment algorithms. Such modified algorithms would still produce more efficient searches on missing columns than current methods for searching missing columns in multi-column indexes.

In summary, preferred embodiments disclose a system, method, and program for searching a list of entries. Each entry is comprised of multiple fields. Each field in the entry may include one of a range of possible values for that field. If search criteria is provided for less than all of the fields, then multiple search keys will be generated such that each generated search key includes a search value for each field. The search value for each field for which there are no provided search criteria comprises one of the possible values for that field. A search operation is executed for each of the generated search keys to determine entries in the list that include field values that match the search values in the search key.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for searching an ordered list of entries, wherein each entry is comprised of multiple fields, wherein each field may include one of a range of possible values for that field, comprising:

providing search criteria for less than all of the fields;

generating multiple search keys, wherein each generated search key includes a search value for each field, wherein the search value for each field for which there are no provided search criteria comprises one of the possible values for that field, and wherein the search value for each field for which there are provided search criteria satisfies the search criteria provided for that field; and executing a search operation for each of the generated search keys to determine entries in the list that include field values that match the search values in the search key.

2. The method of claim 1, wherein the list of entries comprises a database index having rows of index entries and a column for each field, wherein each index entry includes values for each column in the index and information addressing at least one record in a database table.

3. The method of claim 1, wherein generating the search keys comprises generating search keys using each possible value for each field for which there are no provided search criteria.

4. The method of claim 1, wherein search keys are generated including less then all of the possible values for the fields for which there are no provided search criteria.

5. The method of claim 1, wherein each search operation is executed after generating the search key for the search operation, further comprising:

receiving a feedback entry in the list in response to the search operation; and processing the feedback entry to determine a next search key to use in the next search operation.

6. The method of claim 5, wherein the feedback entry is used as the next search key if the feedback entry satisfies the search criteria.

7. The method of claim 5, wherein processing the feedback entry to determine the next search key comprises determining a next possible entry in the list that would immediately follow the feedback entry in the list according to the ordering of the entries in the list and using the determined next possible entry as the next search key.

8. The method of claim 7, wherein determining the next possible entry further comprises determining the next possible entry in the list immediately following the feedback entry that matches the search criteria.

9. The method of claim 1, wherein the list of entries comprises a database index having rows of index entries and a column for each field, wherein each index entry includes values for each column in the index, wherein each search operation is executed after generating the search key for the search operation, further comprising:

receiving a feedback index entry from the index in response to executing the search operation against the index;

determining a next possible entry in the list that would immediately follow the feedback entry in the list; and using the determined next possible entry as the next search key.

10. The method of claim 9, wherein the index stores entries in a tree structure, wherein determining next possible entries and executing search operations comprises traversing nodes of the index tree.

11. A system for searching a list of entries, wherein each entry is comprised of multiple fields, wherein each field may include one of a range of possible values for that field, comprising:

a computer system;

program logic executed by the computer system, comprising:
(i) means for providing search criteria for less than all of the fields;
(ii) means for generating multiple search keys, wherein each generated search key includes a search value for each field, wherein the search value for each field for which there are no provided search criteria comprises one of the possible values for that field, and wherein the search value for each field for which there are provided search criteria satisfies the search criteria provided for that field; and
(iii) means for executing a search operation for each of the generated search keys to determine entries in the list that include field values that match the search values in the search key.

12. The system of claim 11, wherein the list of entries comprises a database index having rows of index entries and a column for each field, wherein each index entry includes values for each column in the index and information addressing at least one record in a database table.

13. The system of claim 11, wherein the program logic for generating the search keys comprises means for generating search keys using each possible value for each field for which there are no provided search criteria.

14. The system of claim 11, wherein the program logic for generating the search keys further includes means for including less then all of the possible values for the fields for which there are no provided search criteria.

15. The system of claim 11, wherein each search operation is executed after generating the search key for the search operation, and wherein the program logic further comprises:

means for receiving a feedback entry in the list in response to the search operation; and means for processing the feedback entry to determine a next search key to use in the next search operation.

16. The system of claim 15, wherein the program logic comprises means for using the feedback entry as the next search key if the feedback entry satisfies the search criteria.

17. The system of claim 15, wherein the program logic for processing the feedback entry to determine the next search key comprises means for determining a next possible entry in the list that would immediately follow the feedback entry in the list according to the ordering of the entries in the list; and means for using the determined next possible entry as the next search key.

18. The system of claim 17, wherein the program logic for determining the next possible entry further comprises means for determining the next possible entry in the list immediately following the feedback entry that matches the search criteria.

19. The system of claim 11, wherein the list of entries comprises a database index having rows of index entries and a column for each field, wherein each index entry includes values for each column in the index, wherein each search operation is executed after generating the search key for the search operation, and wherein the program logic further comprises:

means for receiving a feedback index entry from the index in response to executing the search operation against the index;

means for determining a next possible entry in the list that would immediately follow the feedback entry in the list; and means for using the determined next possible entry as the next search key.

20. The system of claim 19, wherein the index stores entries in a tree structure, wherein the program logic for determining next possible entries and executing search operations comprises means for traversing nodes of the index tree.

21. The system of claim 11, further comprising:

a memory device; and a storage device including the entries, wherein the program logic further comprises means for transferring index entries that include field values that match the search values in the search key from the storage device to the memory device.

22. An article of manufacture for use in programming a computer to search a list of entries, wherein each entry is comprised of multiple fields, wherein each field may include one of a range of possible values for that field, the article of manufacture comprising computer useable media including at least one computer program embedded therein that causes the computer to perform:

providing search criteria for less than all of the fields;

generating multiple search keys, wherein each generated search key includes a search value for each field, wherein the search value for each field for which there are no provided search criteria comprises one of the possible values for that field, and wherein the search value for each field for which there are provided search criteria satisfies the search criteria provided for that field; and executing a search operation for each of the generated search keys to determine entries in the list that include field values that match the search values in the search key.

23. The article of manufacture of claim 22, wherein the list of entries comprises a database index having rows of index entries and a column for each field, wherein each index entry includes values for each column in the index and information addressing at least one record in a database table.

24. The article of manufacture of claim 23, wherein each search operation is executed after generating the search key for the search operation, further causing the computer to perform:

receiving a feedback entry in the list in response to the search operation; and processing the feedback entry to determine a next search key to use in the next search operation.

25. The article of manufacture of claim 24, wherein the feedback entry is used as the next search key if the feedback entry satisfies the search criteria.

26. The article of manufacture of claim 24, wherein processing the feedback entry to determine the next search key comprises determining a next possible entry in the list that would immediately follow the feedback entry in the list according to the ordering of the entries in the list and using the determined next possible entry as the next search key.

27. The article of manufacture of claim 26, wherein determining the next possible entry further comprises determining the next possible entry in the list immediately following the feedback entry that matches the search criteria.

28. The article of manufacture of claim 22, wherein generating the search keys comprises generating search keys using each possible value for each field for which there are no provided search criteria.

29. The article of manufacture of claim 22, wherein search keys are generated including less then all of the possible values for the fields for which there are no provided search criteria.

30. The article of manufacture of claim 22, wherein the list of entries comprises a database index having rows of index entries and a column for each field, wherein each index entry includes values for each column in the index, wherein each search operation is executed after generating the search key for the search operation, further comprising:

receiving a feedback index entry from the index in response to executing the search operation against the index;

determining a next possible entry in the list that would immediately follow the feedback entry in the list; and using the determined next possible entry as the next search key.

31. The article of manufacture of claim 30, wherein the index stores entries in a tree structure, wherein determining next possible entries and executing search operations comprises traversing nodes of the index tree.

* * * * *

UNITED STATES PATENT AND TRADEMARK OFFICE
CERTIFICATE OF CORRECTION

PATENT NO. : 6,513,028 B1 Page 1 of 1
DATED : January 28, 2003
INVENTOR(S) : Lee et al.

It is certified that error appears in the above-identified patent and that said Letters Patent is hereby corrected as shown below:

Column 11,
Line 22, delete "the" and insert -- a --.

Column 12,
Lines 2 and 31, delete "the" and insert -- a --.

Column 13,
Line 12, delete "the" and insert -- a --.

Column 14,
Line 20, delete "the" and insert -- a --.

Signed and Sealed this

Twenty-second Day of November, 2005

JON W. DUDAS
*Director of the United States Patent and Trademark Office*